United States Patent
Ito

(10) Patent No.: US 10,091,393 B2
(45) Date of Patent: Oct. 2, 2018

(54) DOCUMENT CONVEYING DEVICE, DOCUMENT READING APPARATUS, AND DOCUMENT CONVEYING METHOD

(71) Applicants: KABUSHIKI KAISHA TOSHIBA, Tokyo (JP); TOSHIBA TEC KABUSHIKI KAISHA, Tokyo (JP)

(72) Inventor: Takeshi Ito, Mishima Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 72 days.

(21) Appl. No.: 15/410,380

(22) Filed: Jan. 19, 2017

(65) Prior Publication Data

US 2018/0205849 A1    Jul. 19, 2018

(51) Int. Cl.
*H04N 1/60* (2006.01)
*H04N 1/401* (2006.01)
*H04N 1/00* (2006.01)
*H04N 1/04* (2006.01)

(52) U.S. Cl.
CPC .......... *H04N 1/401* (2013.01); *H04N 1/0066* (2013.01); *H04N 1/00602* (2013.01); *H04N 1/00612* (2013.01); *H04N 1/0464* (2013.01); *H04N 2201/0081* (2013.01)

(58) Field of Classification Search
CPC ....................................................... H04N 1/60
See application file for complete search history.

(56) References Cited

U.S. PATENT DOCUMENTS

| | | | |
|---|---|---|---|
| 6,891,648 B2 * | 5/2005 | Inoue | H04N 1/4076 358/461 |
| 7,558,437 B2 | 7/2009 | Misaka | |
| 7,777,918 B2 | 8/2010 | Sekizawa et al. | |
| 7,832,724 B2 * | 11/2010 | Lo | H04N 1/00572 271/184 |
| 8,004,726 B2 * | 8/2011 | Misaka | H04N 1/4076 358/420 |
| 8,553,295 B2 * | 10/2013 | Nishida | H04N 1/00602 358/461 |
| 8,676,111 B2 * | 3/2014 | Aoi | G03G 15/235 399/364 |
| 9,819,838 B2 * | 11/2017 | Hatayama | H04N 1/6075 |
| 2002/0054374 A1 * | 5/2002 | Inoue | H04N 1/4076 358/461 |

(Continued)

*Primary Examiner* — Ted Barnes
(74) *Attorney, Agent, or Firm* — Patterson & Sheridan, LLP

(57) ABSTRACT

A document conveying and reading device includes a drive motor, a paper ejection roller driven by the drive motor, a first reading unit arranged along a document conveying path to face one surface of the document, and a shading roller arranged along the document conveying path to face the first reading unit. The shading roller includes a white reference member used for shading correction and a conveying guide for a document that is conveyed along the document conveying path, is driven by the drive motor together with the paper ejection roller when the drive motor drives the paper ejection roller to rotate in the second direction, and is not driven by the drive motor together with the paper ejection roller when the drive motor drives the paper ejection roller to rotate in the first direction.

16 Claims, 10 Drawing Sheets

(56) References Cited

U.S. PATENT DOCUMENTS

| | | | |
|---|---|---|---|
| 2008/0056737 A1* | 3/2008 | Flemming | G03G 15/5062 399/15 |
| 2008/0137107 A1* | 6/2008 | Futami | H04N 1/121 358/1.4 |
| 2009/0059319 A1* | 3/2009 | Aoki | H04N 1/4076 358/496 |
| 2009/0175671 A1* | 7/2009 | Wincent | B26D 5/14 400/621 |
| 2009/0180157 A1* | 7/2009 | Shimatani | H04N 1/125 358/474 |
| 2009/0180808 A1* | 7/2009 | Hyun-ho | G03G 15/234 399/222 |
| 2010/0220344 A1* | 9/2010 | Tashiro | H04N 1/40056 358/1.13 |
| 2011/0199653 A1* | 8/2011 | Nishikawa | H04N 1/00909 358/483 |
| 2012/0092731 A1* | 4/2012 | Nishida | H04N 1/00602 358/474 |
| 2012/0099169 A1* | 4/2012 | Hyoki | H04N 1/04 358/518 |
| 2012/0112401 A1* | 5/2012 | Tokutsu | B65H 5/26 271/3.19 |
| 2016/0198059 A1* | 7/2016 | Kubo | H04N 1/00896 358/1.13 |
| 2017/0064127 A1* | 3/2017 | Tagawa | H04N 1/0464 |
| 2018/0020108 A1* | 1/2018 | Nakayama | H04N 1/00615 |

* cited by examiner

DOCUMENT CONVEYING DEVICE, DOCUMENT READING APPARATUS, AND DOCUMENT CONVEYING METHOD

FIELD

Embodiments described herein relate generally to a document conveying device, a document reading apparatus, and a document conveying method.

BACKGROUND

A document conveying device including a rear surface reading unit which reads a rear surface of a document is known. Shading correction of the rear surface reading unit is performed by arranging a white reference member and the rear surface reading unit such that these face each other. The white reference member retreats from a position where the white reference member faces the rear surface reading unit when a document is conveyed. A drive source is needed to switch the position of the white reference member, but this would increase the number of drive sources and thus the manufacturing cost of the document conveying device. If a drive source in common with a paper ejection roller is used for moving the white reference member, there is a possibility that a document which is subjected to the ejection by the paper ejection roller is pulled back into a document conveying path when the white reference member rotates while the document to be ejected is still near the paper ejection roller.

DETAILED DESCRIPTION

According to one embodiment, a document conveying and reading device includes a drive motor, a paper ejection roller driven by the drive motor and rotatable in a first direction when ejecting a document and in a second direction opposite to the first direction, a first reading unit arranged along a document conveying path to face one surface of the document, and a shading roller arranged along the document conveying path to face the first reading unit. The shading roller includes a white reference member used for shading correction and a conveying guide for a document that is conveyed along the document conveying path, is driven by the drive motor together with the paper ejection roller when the drive motor drives the paper ejection roller to rotate in the second direction, and is not driven by the drive motor together with the paper ejection roller when the drive motor drives the paper ejection roller to rotate in the first direction.

Figure 1:
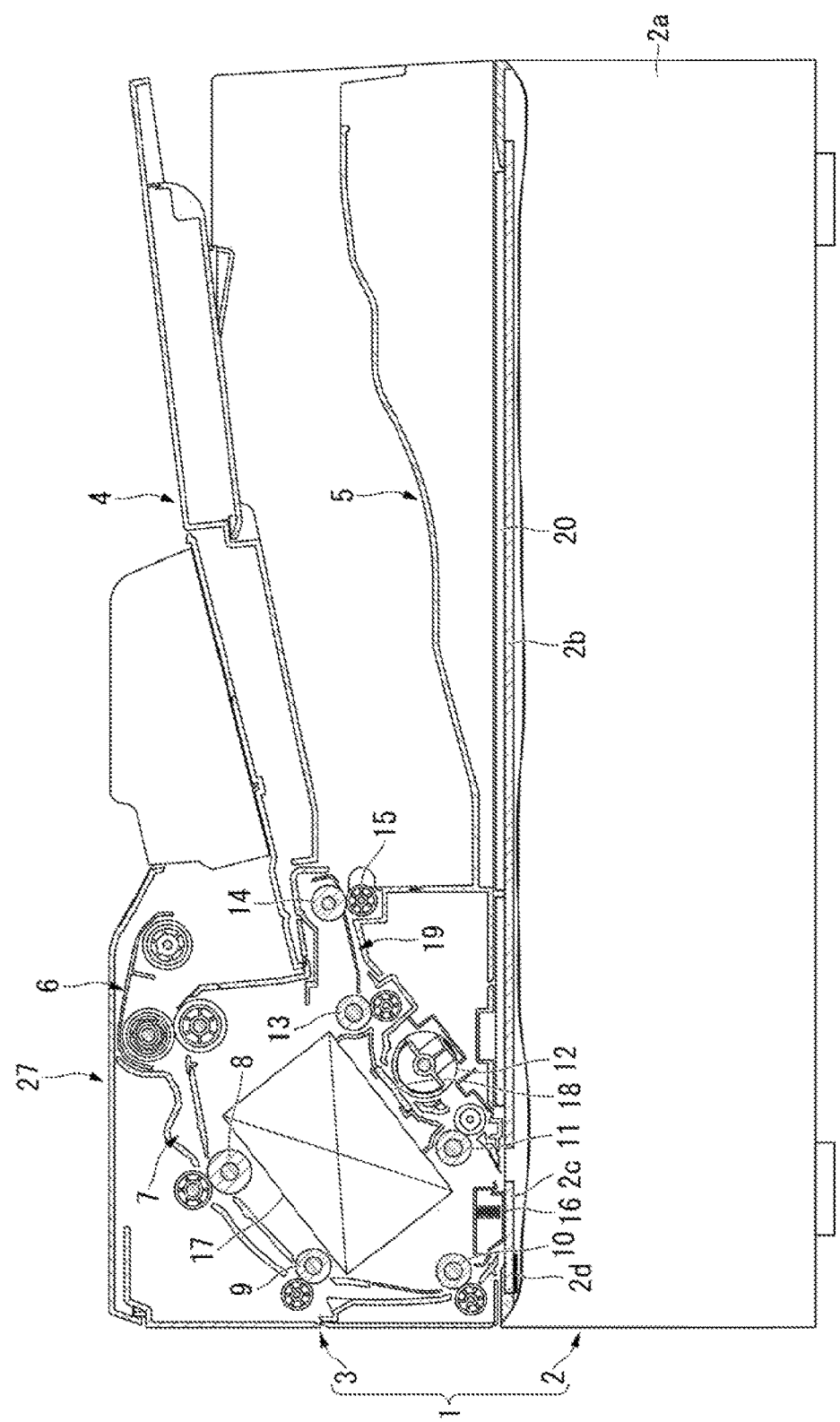
FIG. 1 is a schematic view of a section illustrating an example of the entire configuration of a document reading apparatus according to an embodiment.

Hereinafter, a document conveying device, a document reading apparatus, and document conveying method according to an embodiment will be described with reference to the drawings. FIG. 1 is a schematic view of a section illustrating an example of the entire configuration of the document reading apparatus 1 according to the embodiment.

As illustrated in FIG. 1, a scanner 1 (document reading apparatus) according to the embodiment includes a scanner body 2 and a document conveying device 3.

The scanner 1 reads image information of both surfaces of a document based on the luminance of light, in cooperation with the document conveying device 3. The scanner body 2 reads image information of one surface of the document based on the luminance of light. The scanner 1 may be a multi-color scanner or a black-and-white scanner.

The scanner body 2 includes a platen glass 2b and a front surface reading glass 2c on the top of a case 2a. A document is set on the platen glass 2b. A front surface of the document which is conveyed by the document conveying device 3 is moved on the front surface reading glass 2c.

A white reference member 2d for a front surface is arranged on a rear surface of the front surface reading glass 2c. The white reference member 2d for a front surface is used for shading correction of reading the front surface of the document.

The document conveying device 3 includes a document tray 4, a document conveying unit 27, and a paper ejection tray 5.

A document is set on the document tray 4. An upper surface of the document set on the document tray 4 is referred to as a front surface of the document. A document size sensor (not illustrated) is arranged in the document tray 4. The document size sensor detects a size of a document set on the document tray 4 and transmits a detected document size to a control unit of the scanner body 2 which will be described below.

The document conveying unit 27 conveys the document on the document tray 4 toward the paper ejection tray 5. The document conveying unit 27 ejects the conveyed document on the paper ejection tray 5 such that a front surface of the document is directed downward. The paper ejection tray 5 receives the ejected document from below.

A direction toward the paper ejection tray 5 from the document tray 4 in a document conveying path of the document conveying unit 27 is referred to as a conveying direction.

The document conveying unit 27 includes a first document conveying path 7 and a second document conveying path 19. The first document conveying path 7 is formed between an upper side of the document tray 4 and the front surface reading glass 2*c*. The first document conveying path 7 and the second document conveying path 19 are respectively formed by conveying guide plates facing each other. The first document conveying path 7 is bent in a C shape overall. The second document conveying path 19 is formed between the front surface reading glass 2*c* and an upper side of the paper ejection tray 5.

A paper feeding roller 6 is arranged at an inlet of the first document conveying path 7. The paper feeding roller 6 feeds a document on the document tray 4 into the first document conveying path 7.

A resist roller 8, a first conveying roller 9, and a second conveying roller 10 are arranged in this order in a central portion of the first document conveying path 7 in a conveying direction. The resist roller 8 adjusts a position of a front end of the document which is fed from the paper feeding roller 6, in a conveying direction of the document. The resist roller 8 sends the document to the first conveying roller 9. The first conveying roller 9 and the second conveying roller 10 send the document to an outlet of the first document conveying path 7.

A document holder 16 is arranged between the first document conveying path 7 and the second document conveying path 19. The document holder 16 presses the document onto the front surface reading glass 2*c* in a state where the document can be moved in the conveying direction. While the document passes through the front surface reading glass 2*c* along the front surface reading glass 2*c*, a front surface reading unit (second reading unit), which will be described below, of the scanner body 2 reads a front surface (the other surface) of the document.

The document which passes through the front surface reading glass 2*c* enters the second document conveying path 19.

A third conveying roller 11, a shading roller 12 (shading member), and a fourth conveying roller 13 are arranged in this order in a central portion of the second document conveying path 19 in the conveying direction. A rear surface reading unit 17 (first reading unit) is arranged at a position facing the shading roller 12 and the second document conveying path 19 is interposed therebetween. The rear surface reading unit 17 reads a rear surface (one surface) of the document. A paper ejection roller 14 is arranged at an outlet of the second document conveying path 19.

The third conveying roller 11 conveys the document toward the fourth conveying roller 13 through a gap between the shading roller 12 and the rear surface reading unit 17. The fourth conveying roller 13 conveys the document toward the paper ejection roller 14. The paper ejection roller 14 ejects the document onto the paper ejection tray 5.

Figure 2:
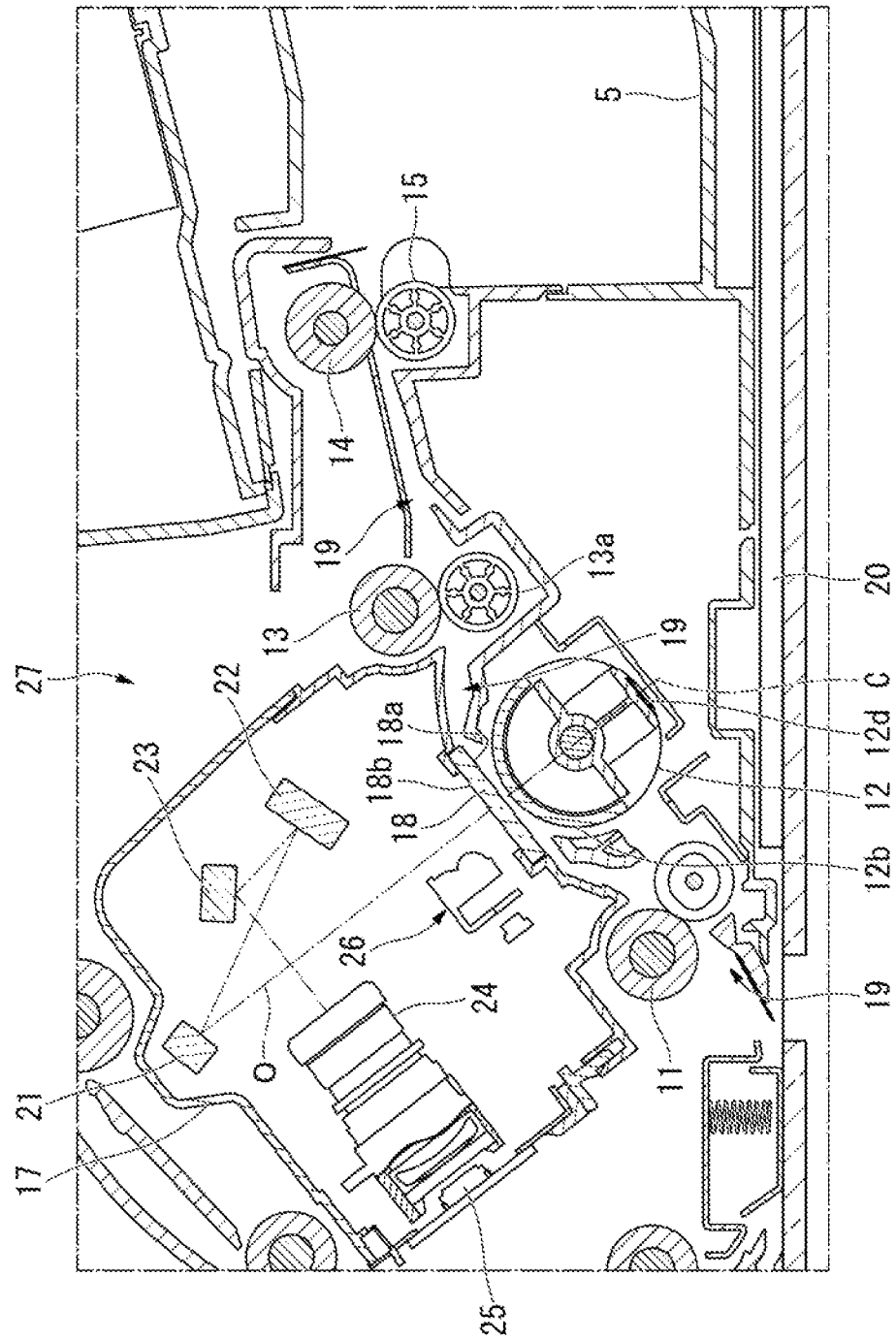
FIG. 2 is a schematic view of a section illustrating a configuration example of a main portion of a document conveying device according to the embodiment.
Figure 3:
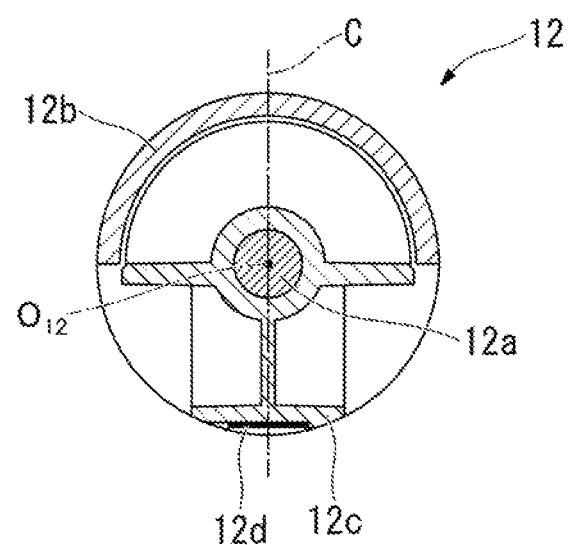
FIG. 3 is a schematic view of a section illustrating a configuration example of a shading member of the document conveying device according to the embodiment.

The rear surface reading unit 17 and the shading roller 12 will be described with reference to FIG. 2 and FIG. 3. FIG. 2 is a schematic view of a section illustrating a configuration example of a main portion of document conveying device 3 according to the embodiment. FIG. 3 is a schematic view of a section illustrating a configuration example of the shading roller 12 of the document conveying device 3 according to the embodiment.

The rear surface reading unit 17 includes a reading optical system and an image capturing element which acquire an image of a rear surface of a document. An example of the rear surface reading unit 17 is illustrated in FIG. 2. The rear surface reading unit 17 includes a rear surface reading glass 18, a reading lens 24, an illumination light source 26, a first mirror 21, a second mirror 22, a third mirror 23, and an image capturing element 25.

The rear surface reading glass 18 is arranged along the second document conveying path 19 such that the rear surface reading glass 18 faces a rear surface of a document conveyed in the direction of the second document conveying path 19. The rear surface of the document which is conveyed through the second document conveying path 19 is moved along a front surface 18*a* of the rear surface reading glass 18 toward an inside of the second document conveying path 19. The front surface 18*a* is a focal surface on an object side of the reading lens 24. An optical axis O of the reading lens 24 is orthogonal to the rear surface reading glass 18.

The illumination light source 26 is arranged on a rear surface 18*b* side of the rear surface reading glass 18. The illumination light source 26 emits illumination light toward the front surface 18*a*. The reading lens 24 receives a reflection light of the rear surface of the document which passes through the front surface 18*a* and forms an image on an image surface thereof.

The first mirror 21, the second mirror 22, and the third mirror 23 turn an optical path between the front surface 18*a* and the reading lens 24. Reflection light which passes through the rear surface reading glass 18 and proceeds on the optical axis O is incident on the reading lens 24 via the first mirror 21, the second mirror 22, and the third mirror 23. The reflection light incident on the reading lens 24 is received to the image surface of the reading lens 24 and an image is formed on the image surface.

The image capturing element 25 is arranged on the image surface of the reading lens 24. The image capturing element 25 includes a line sensor such as a CCD or a CMOS sensor.

As illustrated in FIG. 3, the shading roller 12 includes a roller shaft 12*a*, a conveying guide 12*b*, and a white reference member 12*d* for a rear surface.

The roller shaft 12*a* is a rotary shaft extending along a central axis line $O_{12}$. The roller shaft 12*a* is longer than a maximum width of the document. Both end portions of the roller shaft 12*a* is rotatably supported by a bearing (not illustrated). One end of the roller shaft 12*a* is connected to a drive transfer mechanism (not illustrated). The drive transfer mechanism (not illustrated) rotates only in one direction around the central axis line $O_{12}$ of the roller shaft 12*a*. In the embodiment, the roller shaft 12*a* rotates counterclockwise as illustrated.

The conveying guide 12*b* is formed in an outermost circumference portion of the shading roller 12. The conveying guide 12*b* rotates together with the roller shaft 12*a*. The conveying guide 12*b* has appearance of a semi-cylindrical surface shape which uses the central axis line $O_{12}$ as the center. A length in a direction along the central axis line $O_{12}$ of the conveying guide 12*b* is greater than a maximum document width which can be conveyed in the second document conveying path 19 and a document readable width of the rear surface reading unit 17.

In the shading roller 12, an attachment portion 12*c* extends along a central axis line C on a side opposite to the conveying guide 12*b*. The central axis line C passes through the center of the conveying guide 12b and the central axis line $O_{12}$, and extends in a diameter direction of the shading roller 12.

The white reference member 12d for a rear surface is used for correcting shading of the rear surface reading unit 17. The white reference member 12d for a rear surface has a long flat plate shape in an axis direction of the shading roller 12. The white reference member 12d for a rear surface is arranged so as to be orthogonal to the central axis line C at a front end portion of the attachment portion 12c. The white reference member 12d for a rear surface extends in parallel with the central axis line $O_{12}$ in the axis direction of the shading roller 12.

As such, the conveying guide 12b and the white reference member 12d for a rear surface are arranged in positions different from each other in a diameter direction at an outer circumference portion of the shading roller 12.

The white reference member 12d for a rear surface faces the rear surface reading unit 17 by rotation of the shading roller 12.

A configuration including a control unit of the scanner 1 will be described with reference to FIG. 4.

Figure 4:
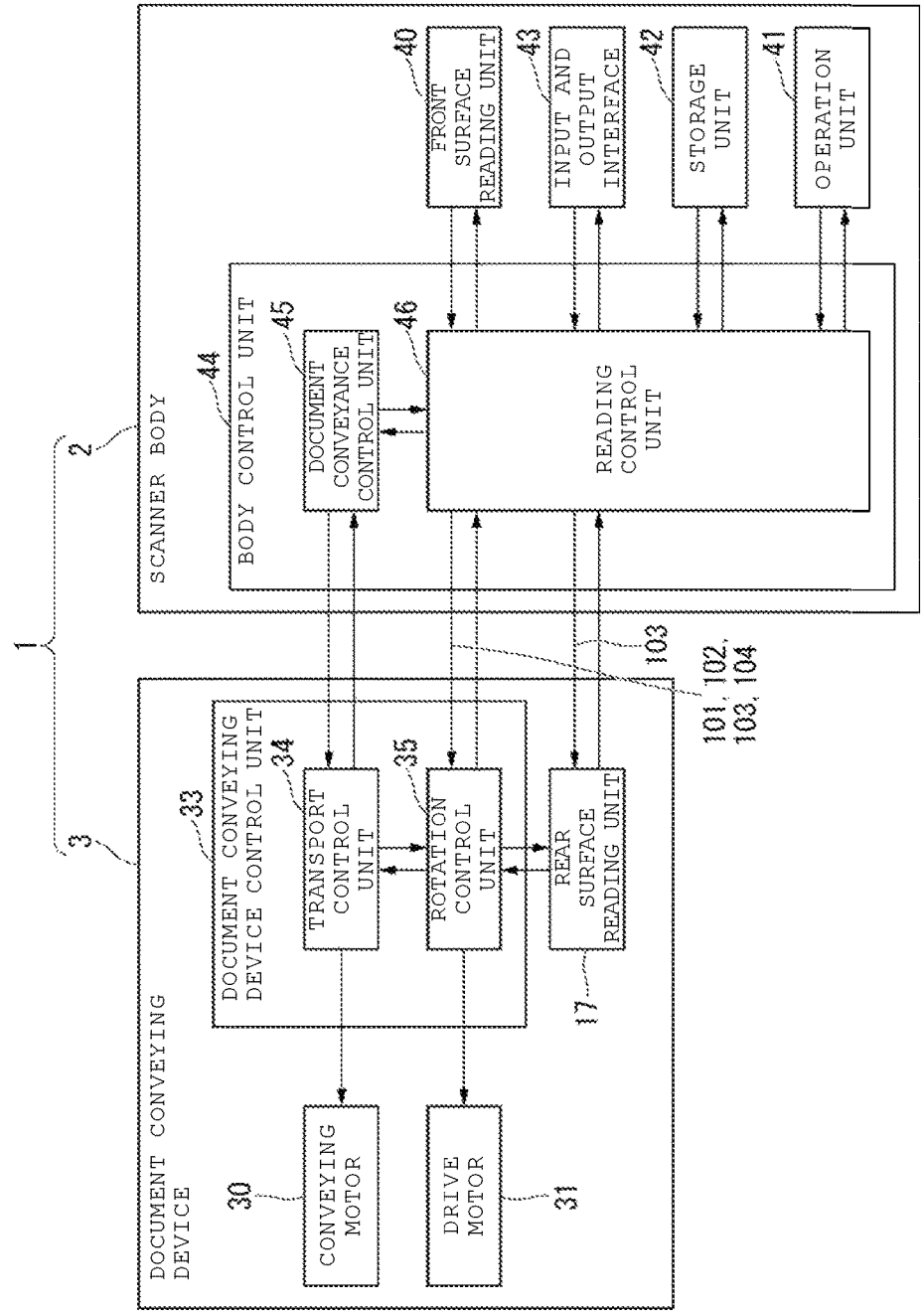
FIG. 4 is a block diagram illustrating a functional configuration of a control unit of the document reading apparatus according to the embodiment.

FIG. 4 is a block diagram illustrating a functional configuration of the control unit of the scanner 1 according to the embodiment.

As illustrated in FIG. 4, the scanner body 2 includes a front surface reading unit 40 (second reading unit), an operation unit 41, a storage unit 42, an input and output interface 43, a document conveying control unit 45, and a reading control unit 46, in addition to the aforementioned configuration. The document conveying control unit 45 and the reading control unit 46 form a body control unit 44.

The front surface reading unit 40 includes at least a reading optical system which acquires an image of a rear surface of a document and an image capturing element which captures an image of the document.

The operation unit 41 receives an operation input of a user and transmits the operation input to the body control unit 44.

The storage unit 42 stores image data which is transmitted from the reading control unit 46.

The input and output interface 43 can be connected to a communication line. The input and output interface 43 transmits the operation input which is transferred from an external device through the communication line to the reading control unit 46. The input and output interface 43 outputs the image data which is transmitted from the reading control unit 46 to the communication line.

The document conveying control unit 45 controls an operation of the document conveying device 3, based on a control signal from the reading control unit 46.

The reading control unit 46 controls the entire operation of the scanner 1, based on the operation input from the operation unit 41 or the input and output interface 43.

As illustrated in FIG. 4, the document conveying device 3 includes a conveying motor 30, a drive motor 31, and a document conveying device control unit 33, in addition to the aforementioned configuration.

The conveying motor 30 drives the paper feeding roller 6, the resist roller 8, the first conveying roller 9, the second conveying roller 10, the third conveying roller 11, and the fourth conveying roller 13 in the document conveying unit 27. The conveying motor 30 includes one or more motors. The conveying motor 30 drives each of the aforementioned rollers through an appropriate drive transfer mechanism.

The drive motor 31 rotates the paper ejection roller 14 in a first direction (a counterclockwise direction illustrated in FIG. 2) in which a document is conveyed toward the paper ejection tray 5, and a second direction (a clockwise direction illustrated in FIG. 2) opposite to the first direction.

Driving force of the drive motor 31 is transferred to the roller shaft 12a of the shading roller 12 through a drive transfer mechanism (not illustrated). The drive transfer mechanism between the drive motor 31 and the shading roller 12 rotates the shading roller 12 in a constant direction, only in a case where the paper ejection roller 14 rotates in the second direction. For example, the drive transfer mechanism between the drive motor 31 and the shading roller 12 may include a one-way clutch.

As illustrated in FIG. 4, the document conveying device control unit 33 includes a conveying control unit 34 and a rotation control unit 35.

The conveying control unit 34 controls driving of the conveying motor 30, based on a control signal from the document conveying control unit 45 of the scanner body 2.

The rotation control unit 35 controls driving of the drive motor 31, based on control signals from the conveying control unit 34 and the reading control unit 46 of the scanner body 2.

Detailed control of the body control unit 44 and the document conveying device control unit 33 will be described below while an operation of the scanner 1 is described.

In the present embodiment, a computer including, for example, a CPU, a memory, an input and output interface, an external storage device, and the like, and appropriate hardware are used for configuring each device of the body control unit 44 and the document conveying device control unit 33.

In the operation of the scanner 1, an operation of the document conveying device 3 will be described by focusing on a document conveying method according to the present embodiment.

Figure 5:
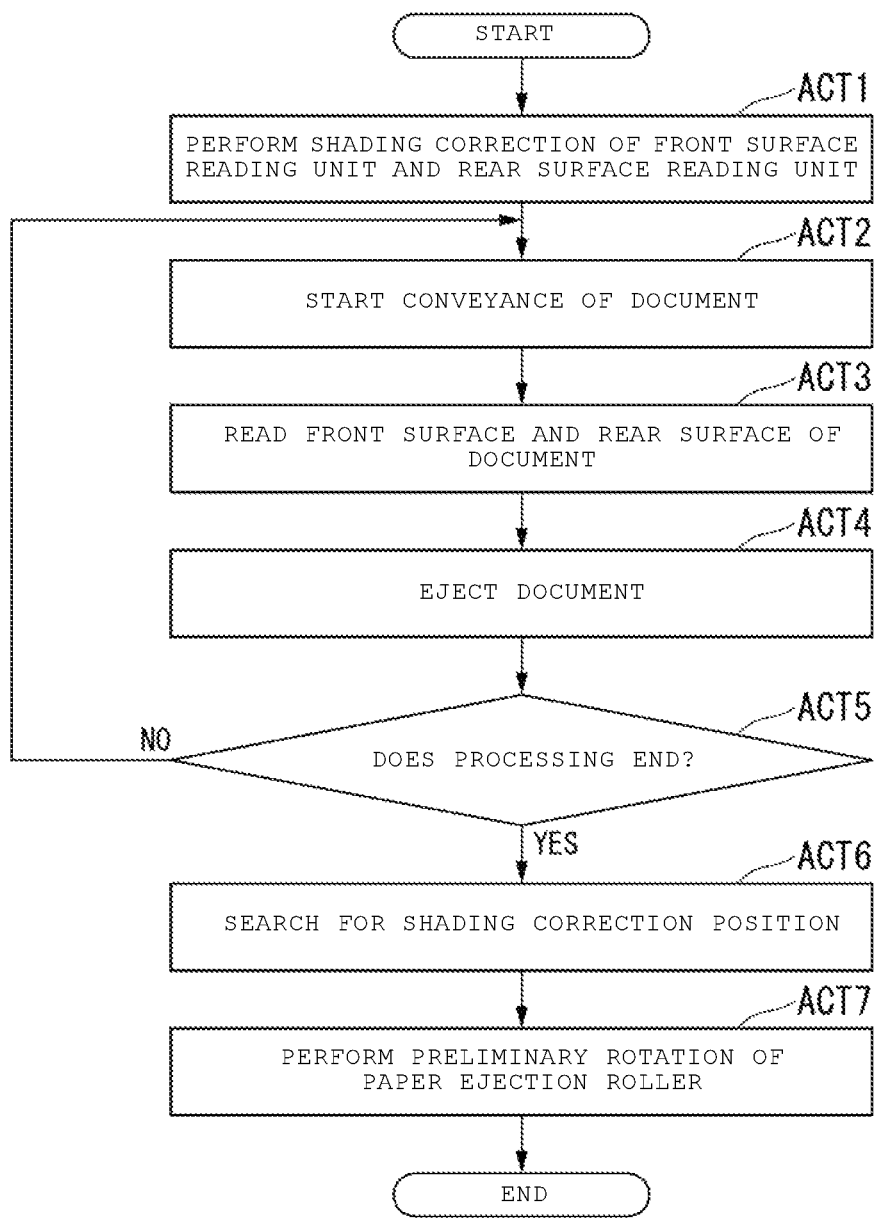
FIG. 5 is a flowchart describing an operation of the document reading apparatus according to the embodiment.
Figure 6:
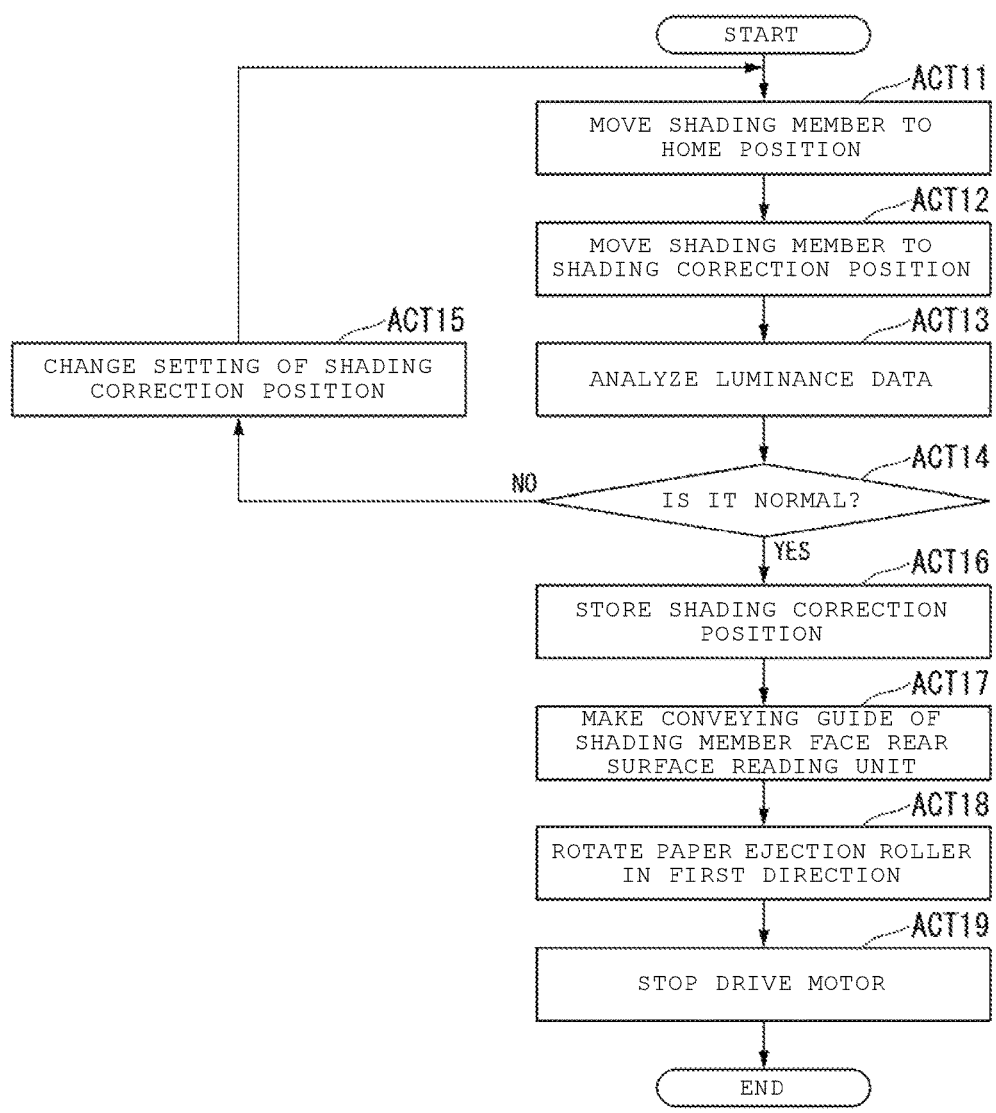
FIG. 6 is a flowchart describing an operation of the document reading apparatus including a document conveying method according to the embodiment.

FIG. 5 is a flowchart describing the operation of the scanner 1 according to the embodiment. FIG. 6 is a flowchart describing the operation of the scanner 1 including the document conveying method according to the embodiment.

FIG. 5 illustrates a flow of an operation of reading a front surface and a rear surface of a document which is conveyed by the document conveying device 3. However, the operation flow is performed after an initialization operation after power is turned on. When the power is turned on, the same operation as ACT6 which will be described below may be performed before the operation flow starts.

If the initialization operation of a document reading job is started, the shading roller 12 rotates to an angular position where the conveying guide 12b faces the rear surface reading glass 18, as illustrated in FIG. 2. The central axis line C of the shading roller 12 substantially coincides with the optical axis O.

A user sets a document on the document tray 4 in a state where a front surface of the document is facing upward.

The scanner 1 reads all documents stacked on the document tray 4. The document conveying device 3 detects presence or absence of a document on the document tray 4, using a document size sensor (not illustrated) of the document tray 4. If all the documents on the document tray 4 are fed into the first document conveying path 7, the document reading job ends.

A document size sensing sensor transmits a document size to the reading control unit 46.

If the user inputs an operation input to start the document reading job from the operation unit 41 of the scanner 1, the operation illustrated in FIG. 5 starts.

The reading control unit 46 performs shading correction of the front surface reading unit 40 and the rear surface reading unit 17 (ACT1).

The reading control unit 46 causes the front surface reading unit 40 to read luminance data of reflection light from the white reference member 2d for a front surface. The front surface reading unit 40 transmits the read luminance data to the reading control unit 46. The reading control unit 46 generates data for shading correction for each pixel which is read by the front surface reading unit 40.

The reading control unit 46 causes the rear surface reading unit 17 to perform a shading correction operation.

The reading control unit 46 transmits a control signal 101 (first control signal) for rotating the shading roller 12 to SCP (Shading Correction Position) to the rotation control unit 35. The rotation control unit 35 drives the drive motor 31 such that the shading roller 12 rotates up to the SCP. The white reference member 12d for a rear surface moves to the SCP. Thereafter, the rear surface reading unit 17 reads luminance data of the reflection light from the white reference member 12d for a rear surface. The luminance data which is read by the rear surface reading unit 17 is transmitted to the reading control unit 46.

After the rear surface reading unit 17 ends reading, the rotation control unit 35 drives the drive motor 31. The conveying guide 12b of the shading roller 12 moves into a reading range of the rear surface reading unit 17.

The reading control unit 46 generates data for shading correction for each pixel which is read by the rear surface reading unit 17.

The reading control unit 46 stores each piece of the shading correction data which is generated, in the storage unit 42. The reading control unit 46 notifies the document conveying control unit 45 that each shading correction ends.

By performing the aforementioned processing, ACT1 ends.

After ACT1 ends, the document conveyance control unit 45 performs control to start conveyance of a document. The document conveyance control unit 45 transmits a control signal to start conveyance of the document to the conveyance control unit 34. The conveyance control unit 34 drives the drive motor through the rotation control unit 35. The document conveying unit 27 starts conveyance of the document (ACT2).

In ACT2, the drive motor 31 rotates in the first direction, and then a driving force of the drive motor 31 is not transmitted to the shading roller 12.

After ACT2 is performed, the front surface reading unit 40 reads a front surface of the document. Furthermore, the rear surface reading unit 17 reads a rear surface of the document (ACT3).

The paper feeding roller 6 feeds an uppermost document of the documents stacked on the document tray 4 to the first document conveying path 7. A position of a front end of the document is aligned by the resist roller 8. The document is conveyed in the first document conveying path 7 by the resist roller 8, the first conveying roller 9, and the second conveying roller 10. The document enters the second document conveying path 19 through a gap between the front surface reading glass 2c and the document holder 16.

The front surface reading unit 40 reads the front surface of the document which passes through the front surface reading glass 2c.

The document, after entering the second document conveying path 19, is conveyed by the third conveying roller 11. After passing through a gap between the rear surface reading glass 18 and the conveying guide 12b, the document is conveyed by the fourth conveying roller 13 to the paper ejection roller 14.

The rear surface reading unit 17 reads a rear surface of the document which passes through the rear surface reading glass 18.

By performing the aforementioned processing, ACT3 ends.

After ACT3 ends, the document is ejected onto the paper ejection tray 5 (ACT4). The document conveyed to the paper ejection roller 14 is ejected onto the paper ejection tray 5 through a gap between the paper ejection roller 14 rotating in the first direction and the scanner 15. A jam sensing sensor (not illustrated) arranged along the second document conveying path 19 senses passage of a rear end of the document. The jam sensing sensor notifies the conveyance control unit 34 that the rear end of the document passes the jam sensing sensor. The conveyance control unit 34 notifies the document conveyance control unit 45 that document ejection ends, after receiving notification from the jam sensing sensor.

By performing the aforementioned processing, ACT4 ends.

After ACT4, the document conveyance control unit 45 determines whether or not processing ends (ACT5).

If it is determined that the processing ends (ACT5: YES), the conveyance control unit 34 stops controlling of the document conveying unit 27. Furthermore, the document conveyance control unit 45 performs ACT6 according to the reading control unit 46.

If the processing does not end (ACT5: NO), the document conveyance control unit 45 performs ACT2.

If the document size sensor (not illustrated) of the document tray 4 does not detect any document on the document tray 4, the scanner 1 determines that the processing ends.

The SCP is searched for in ACT6. After ACT6 ends, preliminary rotation of the paper ejection roller 14 is performed (ACT7).

Detailed of ACT6 and ACT7 is explained with reference to FIG. 6 to FIG. 13.

FIG. 6 is a flowchart describing an operation of the document conveying device including a document conveying method according to the embodiment, and a document reading apparatus. FIG. 7 to FIG. 13 are schematic views of a section illustrating an operation of the document conveying device according to the embodiment.

Figure 7:
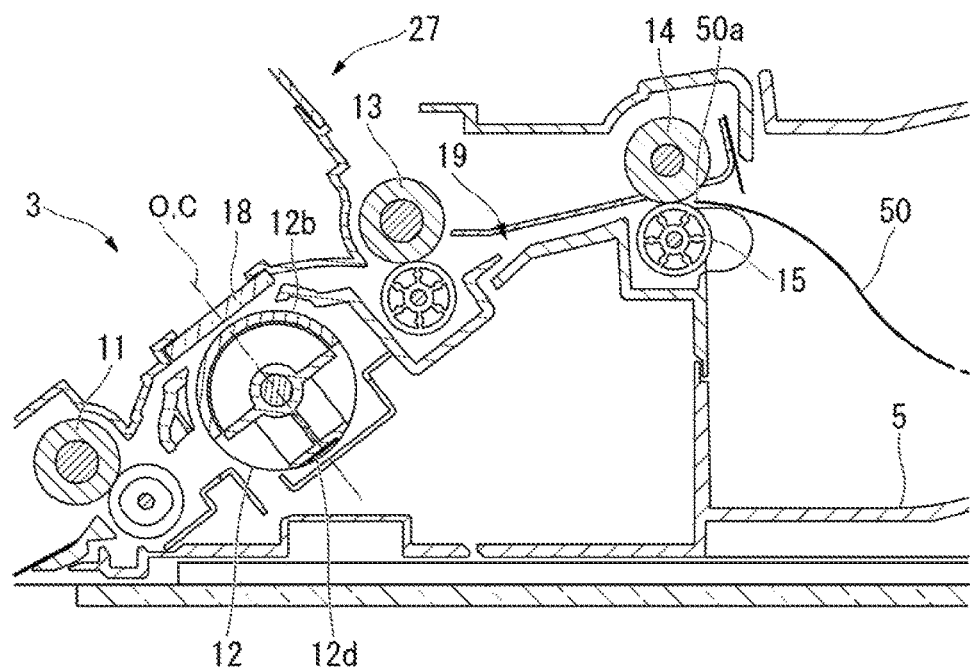
FIG. 7 is a schematic view of a section illustrating an operation of the document conveying device according to the embodiment.

ACT6 in FIG. 5 is performed in accordance with an operation flow from ACT11 to ACT17 in FIG. 7.

FIG. 7 illustrates an example of a state immediately before ACT6. The document conveying unit 27 is stopped. The conveying guide 12b of the shading roller 12 faces the rear surface reading glass 18. The central axis line C of the shading roller 12 substantially coincides with the optical axis O. A document 50 ejected onto the paper ejection tray 5 is not interposed between the paper ejection roller 14 and the scanner 15. However, according to a situation at the time of ejecting the document 50, a rear end 50a of the document 50 can remain near the paper ejection roller 14 as illustrated in FIG. 7. In this case, the document 50 can be pulled back into the second document conveying path 19 by a search operation of the SCP as will be described hereinafter.

The reading control unit 46 transmits a control signal 103 (third control signal) to search for the SCP to the rotation control unit 35 and the rear surface reading unit 17. ACT6 starts.

Figure 8:
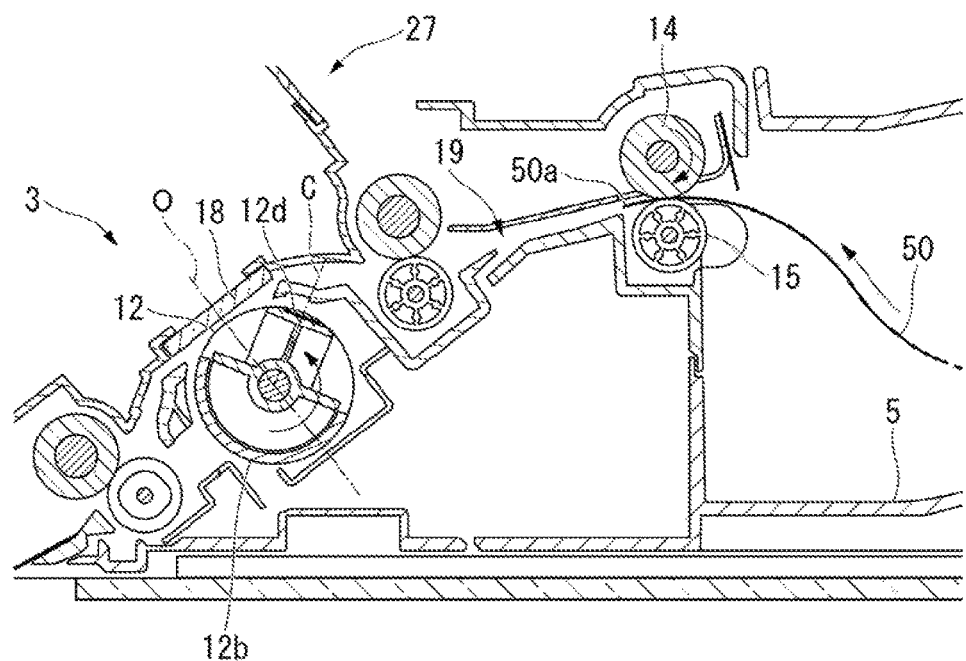
FIG. 8 is a schematic view of a section illustrating an operation of the document conveying device according to the embodiment.
Figure 9:
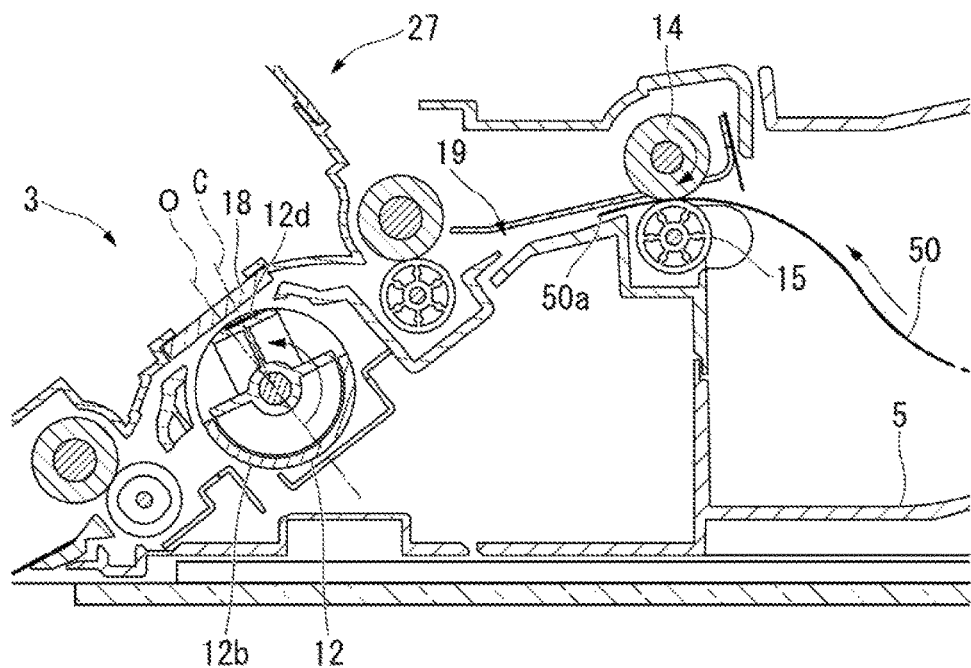
FIG. 9 is a schematic view of a section illustrating an operation of the document conveying device according to the embodiment.

As illustrated in FIG. 8, the rotation control unit 35 rotates the shading roller 12 to a home angular position (hereinafter, referred to as HP) (ACT11). The rotation control unit 35 drives the drive motor 31 such that the paper ejection roller 14 rotates in a second direction. The shading roller 12 rotates counterclockwise as illustrated in FIG. 8. A HP sensor (not illustrated) which detects the HP is arranged at an end portion of the shading roller 12. If the HP sensor senses that the shading roller 12 reaches the HP, the rotation control unit 35 stops the drive motor 31.

During this period, the paper ejection roller 14 rotates in the second direction (clockwise direction which is illustrated). The document 50 still touching the paper ejection roller 14 is pulled back into the second document conveying path 19 in conjunction with the rotation of the paper ejection roller 14.

Thereafter, the rotation control unit 35 rotates the shading roller 12 from the HP to the SCP, as illustrated in FIG. 8 (ACT12). Information of the SCP is transmitted from the reading control unit 46 to the rotation control unit 35 before ACT12 starts. At the angular position of the SCP, a partial region of the white reference member 12*d* for a rear surface in a circumferential direction is located on the optical axis O. The paper ejection roller 14, according to the rotational movement from the HP to the SCP in ACT12, further rotates in the second direction. The rear end 50*a* of the document 50 is further drawn into the second document conveying path 19.

After the shading roller 12 rotates to the SCP, the rear surface reading unit 17 reads the luminance data of the reflection light from the white reference member 12*d* for a rear surface. The rear surface reading unit 17 transmits the luminance data to the reading control unit 46. The reading control unit 46 analyzes the luminance data (ACT13). For example, the reading control unit 46 detects a change of the luminance data in a pixel arrangement direction.

The reading control unit 46 determines whether or not the luminance data is normal (ACT14). If the luminance data is normal (ACT14: YES), ACT16 is performed. If the luminance data is not normal (ACT14: NO), ACT15 is performed.

If the luminance data is not normal, there is a possibility that dust is adhering on the white reference member 12*d* for a rear surface, adhesion of dirt onto the white reference member 12*d* for a rear surface, or the like. If shading correction is performed in a state where the luminance data is not normal, image quality of the read image can be impaired.

In ACT15, the reading control unit 46 transmits information of new SCP to the rotation control unit 35. After ACT15, ACT11 is performed.

As described above, ACT11 to ACT15 are performed, and thus, search of the SCP is performed to acquire normal luminance data.

Figure 10:
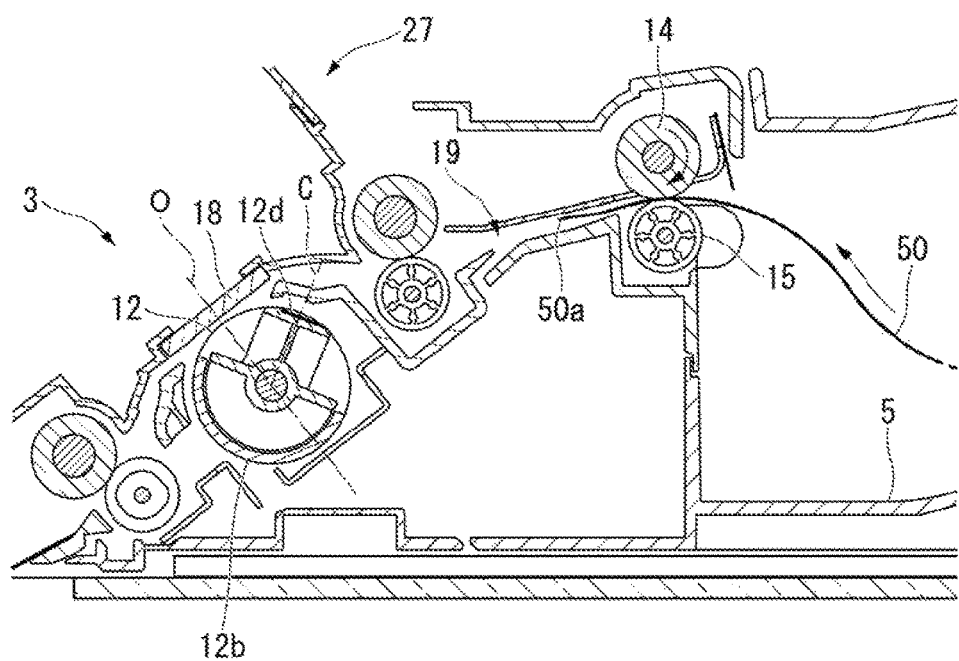
FIG. 10 is a schematic view of a section illustrating an operation of the document conveying device according to the embodiment.

For example, in a second execution of ACT11, the shading roller 12 rotates up to the HP (refer to FIG. 10). In a second execution of ACT12, the shading roller 12 rotates to the SCP set in a first execution of ACT15 (refer to FIG. 11). The shading roller 12 at the new SCP shifts slightly to the counterclockwise side than the previous SCP as illustrated.

Figure 11:
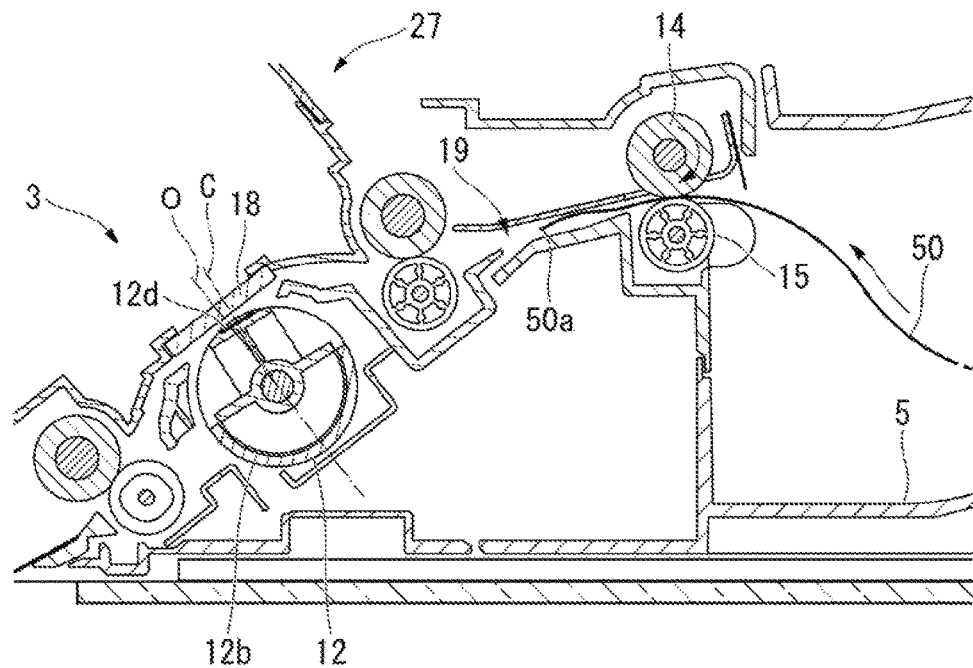
FIG. 11 is a schematic view of a section illustrating an operation of the document conveying device according to the embodiment.

As illustrated in FIGS. 10 and 11, as ACT11 and ACT12 are repeated, the paper ejection roller 14 further rotates in the second direction. The rear end 50*a* of the document 50 moves toward the shading roller 12 through the second document conveying path 19.

In ACT16, the reading control unit 46 causes the storage unit 42 to store the SCP that is determined to be normal. The search operation of the SCP ends.

The reading control unit 46 transmits a control signal 102 (second control signal) to the rotation control unit 35 to rotate the shading roller 12 such that the conveying guide 12*b* faces the rear surface reading unit 17. The rotation control unit 35 rotates the shading roller 12 from the SCP. The rotation control unit 35 causes the conveying guide 12*b* to face the rear surface reading unit 17 (ACT17). This rotational movement is performed without returning an angular position of the shading roller 12 to the HP.

The paper ejection roller 14 also further rotates in the second direction in accordance with the rotation of the shading roller 12 in ACT17. The rear end 50*a* of the document 50 moves toward the shading roller 12 through the second document conveying path 19.

ACT7 in FIG. 5 is performed in the same manner as ACT18 and ACT19 in FIG. 6.

Figure 12:
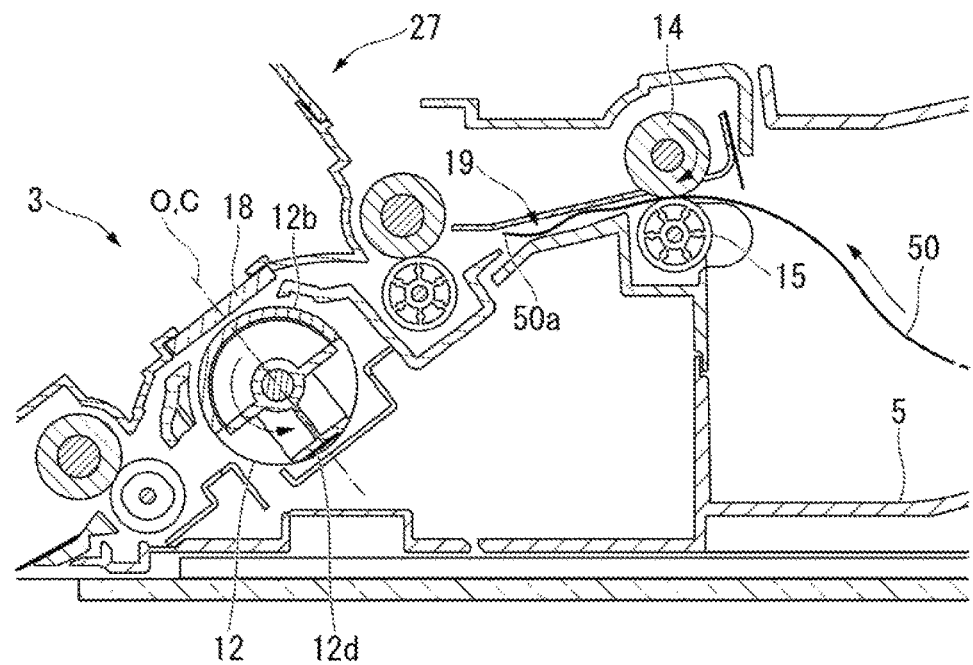
FIG. 12 is a schematic view of a section illustrating an operation of the document conveying device according to the embodiment.
Figure 13:
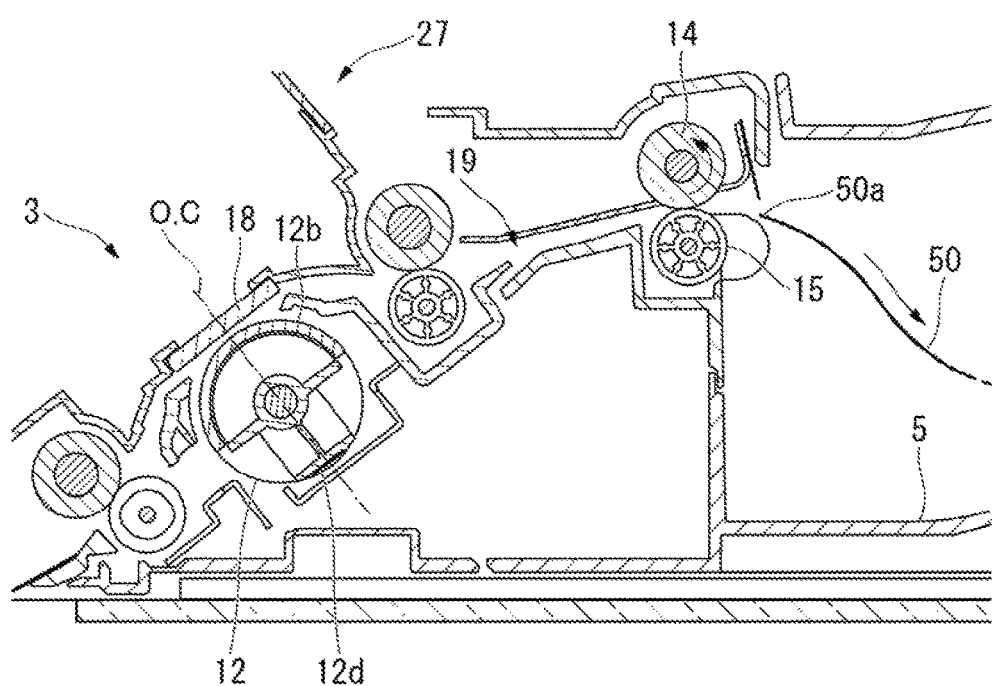
FIG. 13 is a schematic view of a section illustrating an operation of the document conveying device according to the embodiment.

In ACT18, the rotation control unit 35 rotates the drive motor 31 such that the paper ejection roller 14 rotates in the first direction (refer to FIG. 12). A driving force of the drive motor 31 is not transferred to the shading roller 12.

As the paper ejection roller 14 rotates in the first direction, the document 50 which is interposed between the paper ejection roller 14 and the scanner 15 moves in the conveying direction. The paper ejection roller 14 is driven such that the document 50 is conveyed in a length or more in which the document 50 is drawn into the second document conveying path 19. Thereafter, the drive motor 31 stops (ACT19).

The rear end 50*a* of the document 50 passes through the paper ejection roller 14. The document 50 is dropped onto the paper ejection tray 5 (refer to FIG. 13).

For example, a maximum pulling-in length of the document 50 which can be pulled in the search operation of the SCP is referred to as L, and a radius of the paper ejection roller 14 is referred to as r. In this case, the paper ejection roller 14 may rotate more than L/2 πr rotation.

For example, the maximum pulling-in length L of the document 50 maybe set to be less than a length L' of the second document conveying path 19 between the paper ejection roller 14 and the shading roller 12. In this case, the paper ejection roller 14 may rotate by time until a length of an ejected part of a paper which is ejected by the paper ejection roller 14 becomes greater than or equal to the length L', in a preliminary rotation.

However, the paper ejection roller 14 may further rotate even after the document 50 is ejected. In this case, even if the rear end 50*a* of the document 50 returns near the paper ejection roller 14, the document is ejected farther away by rotation of the paper ejection roller 14.

After ACT19, ACT7 in FIG. 5 ends.

If the document conveying unit 27 is kept in stopping state where the document 50 is pulled back into the second document conveying path 19, there is a probability that the pulled document 50 is unable to be removed. Even if the document is removed, the document 50 may be damaged.

As described above, in the present embodiment, a preliminary rotation of the paper ejection roller 14 is performed after the processing ends. By performing the preliminary rotation, the document 50 can be reliably ejected, even if the document 50 is pulled back into the second document conveying path 19 when a search operation of the SCP is performed.

The document conveying device, the document conveying method, and the document reading apparatus according to the present embodiment do not require an operation to remove the document 50, and it is possible to prevent the document 50 from being damaged due to the operation to remove the document.

In the present embodiment, the shading roller 12 is driven in conjunction with the drive motor 31 which drives the paper ejection roller 14. In the present embodiment, a motor which independently drives the shading roller 12, or a clutch or the like which switches driving of the paper ejection roller 14 is not needed. A configuration of the document conveying unit 27 is simplified.

Hereinafter, a modification example of the aforementioned embodiment is explained.

In the aforementioned embodiment, a case where the preliminary rotation is performed when the processing ends is described as an example. The preliminary rotation may be performed at any time, as long as after the shading roller 12 starts to rotate and then stops and before the document conveyance starts. For example, the preliminary rotation may be performed before the document conveyance starts after the shading correction ends.

In the aforementioned embodiment, a case where the drive motor 31 drives only the paper ejection roller 14 and the shading roller 12 is described as an example. However, the drive motor 31 may further drive other conveying rollers in addition to the paper ejection roller 14 and the shading roller 12.

In the aforementioned embodiment, a case where the scanner body 2 of the scanner 1 is a scanner of a flatbed type is described as an example. However, the scanner 1 may be a scanner of a sheet-fed type including the document conveying device 3.

According to at least one embodiment described above, a document conveying device rotates a shading member in conjunction with rotation of a paper ejection roller in a second direction, and stops the shading member at a position where a conveying guide faces a first reading unit, according to a rotation control unit. Thereafter, the rotation control unit performs preliminary rotation which rotates the paper ejection roller in the first direction before document conveyance starts. The document conveying device according to the embodiment can reliably eject a document even if the document which is ejected by the paper ejection roller is pulled back. Removing the document is not required, and it is possible to prevent the document from being damaged due to the operation to remove the document.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document conveying and reading device, comprising:
   a drive motor;
   a paper ejection roller that is driven by the drive motor, and is able to rotate in a first direction when ejecting a document and a second direction opposite to the first direction;
   a first reading unit arranged along a document conveying path to face one surface of a document; and
   a shading roller arranged along the document conveying path to face the first reading unit, wherein the shading roller includes a white reference member used for shading correction and a conveying guide for a document that is conveyed along the document conveying path, is driven by the drive motor together with the paper ejection roller when the drive motor drives the paper ejection roller to rotate in the second direction, and is not driven by the drive motor together with the paper ejection roller when the drive motor drives the paper ejection roller to rotate in the first direction.

2. The device according to claim 1, further comprising:
   a control unit configured to control the drive unit to rotate the shading roller to search for a shading correction position of the shading roller.

3. The device according to claim 2, wherein the control unit is configured to control the drive unit to rotate the shading roller, such that the shading roller is rotated until the shading correction position of the shading roller is obtained.

4. The device according to claim 3, wherein the control unit is configured to control the drive unit to rotate the shading roller and the paper ejection roller, such that after the shading correction position of the shading roller is obtained, the shading roller and the paper ejection roller are rotated until the conveying guide of the shading roller faces the first reading unit, and then the paper ejection roller is rotated in the first direction while the conveying guide of the shading roller remains facing the first reading unit.

5. The device according to claim 2, further comprising:
   a second reading unit arranged along the document conveying path to face the other surface of the document,
   wherein the control unit is configured to control reading operations carried out by the first and second reading units.

6. The device according to claim 5, wherein the control unit is configured to perform shading correction operation of the first and second reading units.

7. The device according to claim 6, wherein the first reading unit is downstream of the second reading unit in the document conveying path.

8. The device according to claim 1, wherein the white reference member and the conveying guide are arranged on the roller to face opposite directions.

9. A method of performing shading correction in a document conveying and reading device, comprising:
   conveying a document along a document conveying path;
   reading a first surface of the document and then a second surface of the document;
   after the reading, rotating a paper ejection roller in a first direction to eject the document; and
   rotating a shading roller to search for a shading correction position of the shading roller, wherein rotating the shading roller also causes rotation of the paper ejection roller in a second direction that is opposite the first direction.

10. The method of claim 9, wherein the shading roller is rotated until the shading correction position of the shading roller is obtained.

11. The method of claim 10, wherein the shading roller includes a white reference member used for shading correction and a conveying guide for a document that is conveyed along the document conveying path, and the white reference member is arranged along the document conveying path when the shading roller is in the shading correction position.

12. The method of claim 11, further comprising:
   after the shading correction position of the shading roller is obtained, rotating the shading roller until the conveying guide of the shading roller is arranged along the document conveying path.

13. The method of claim 12, further comprising:
rotating the paper ejection roller in the first direction while the conveying guide of the shading roller is arranged along the document conveying path.

14. The method of claim 11, wherein the white reference member and the conveying guide are arranged on the roller to face opposite directions.

15. The method of claim 11, wherein the search for the shading correction position of the shading roller includes:
reading luminance data of reflection light from the white reference member; and
analyzing the luminance data for abnormalities.

16. The method of claim 15, wherein the shading roller is rotated to a different shading correction position if abnormalities are found in the luminance data.

* * * * *